United States Patent
Yan et al.

(10) Patent No.: US 10,271,072 B2
(45) Date of Patent: Apr. 23, 2019

(54) VIDEO PRELOADING METHOD AND APPARATUS

(71) Applicant: TENCENT TECHNOLOGY (SHENZHEN) COMPANY LIMITED, Shenzhen (CN)

(72) Inventors: Hualiang Yan, Shenzhen (CN); Zirong Zhu, Shenzhen (CN); Rongke Chen, Shenzhen (CN); Tao Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/934,473

(22) Filed: Mar. 23, 2018

(65) Prior Publication Data

US 2018/0213268 A1 Jul. 26, 2018

Related U.S. Application Data

(63) Continuation of application No. PCT/CN2017/072217, filed on Jan. 23, 2017.

(30) Foreign Application Priority Data

Jan. 28, 2016 (CN) .......................... 2016 1 0059414

(51) Int. Cl.
*H04N 21/24* (2011.01)
*H04N 21/234* (2011.01)
(Continued)

(52) U.S. Cl.
CPC ... *H04N 21/23406* (2013.01); *H04L 65/4084* (2013.01); *H04L 65/80* (2013.01);
(Continued)

(58) Field of Classification Search
CPC ..................... H04N 21/2401; H04N 21/23406
See application file for complete search history.

(56) References Cited

U.S. PATENT DOCUMENTS

| 2011/0153856 | A1* | 6/2011 | Piepenbrink | ........ | H04L 47/2416 |
| | | | | | 709/231 |
| 2014/0366069 | A1* | 12/2014 | Ramamurthi | ......... | H04W 36/22 |
| | | | | | 725/62 |

(Continued)

FOREIGN PATENT DOCUMENTS

| CN | 102868908 A | 1/2013 |
| CN | 102970179 A | 3/2013 |

(Continued)

OTHER PUBLICATIONS

The World Intellectual Property Organization (WIPO) International Search Report for PCT/CN2017/072217 dated May 2, 2017 5 Pages (including translation).

*Primary Examiner* — Junior O Mendoza
(74) *Attorney, Agent, or Firm* — Anova Law Group, PLLC (57) ABSTRACT

The present disclosure discloses a video preloading method and apparatus. The method includes: obtaining a playing request for playing a first video in a first application client; detecting a data transmission speed of a network of the first application client when playing the first video; adjusting, according to the detected data transmission speed, a preloading length of the first video in the first application client; and preloading, in the first application client, video frames of the first video based on the preloading length of the first video.

12 Claims, 3 Drawing Sheets

(51) Int. Cl.
*H04N 21/433* (2011.01)
*H04N 21/845* (2011.01)
*H04N 21/238* (2011.01)
*H04N 21/654* (2011.01)
*H04N 21/63* (2011.01)
*H04L 29/08* (2006.01)
*H04L 29/06* (2006.01)
*H04L 12/26* (2006.01)

(52) U.S. Cl.
CPC .......... *H04L 67/02* (2013.01); *H04L 67/2847* (2013.01); *H04N 21/238* (2013.01); *H04N 21/2402* (2013.01); *H04N 21/433* (2013.01); *H04N 21/632* (2013.01); *H04N 21/654* (2013.01); *H04N 21/845* (2013.01); *H04L 43/0894* (2013.01)

(56) References Cited

U.S. PATENT DOCUMENTS

| | | | |
|---|---|---|---|
| 2015/0040178 A1* | 2/2015 | Kortum | H04N 7/17318 725/134 |
| 2018/0084025 A1* | 3/2018 | Masuda | H04L 65/607 |
| 2018/0241675 A1* | 8/2018 | Roncero Izquirdo | H04L 47/12 |

FOREIGN PATENT DOCUMENTS

| | | | | |
|---|---|---|---|---|
| CN | 103051955 A | | 4/2013 | |
| CN | 103152651 A | * | 6/2013 | ......... H04N 21/2401 |
| CN | 105657523 A | | 6/2016 | |
| WO | 2010051199 A1 | | 5/2010 | |

\* cited by examiner

VIDEO PRELOADING METHOD AND APPARATUS

RELATED APPLICATION

This application is a continuation application of PCT Patent Application No. PCT/CN2017/072217, filed on Jan. 23, 2017, which claims priority to Chinese Patent Application No. 201610059414.0, filed with the Chinese Patent Office on Jan. 28, 2016 and entitled "VIDEO PRELOADING METHOD AND APPARATUS", the entire contents of both of which are incorporated herein by reference.

FIELD OF THE TECHNOLOGY

The present disclosure relates to the video playing field, and specifically, to a video preloading method and apparatus.

BACKGROUND OF THE DISCLOSURE

When an application client plays a video, a video downloading speed is generally limited to avoid that video downloading occupies excessive bandwidth. However, a limited downloading speed may cause a problem such as video pause. An existing application client preloads a video. However, because a length of the preloaded video is usually fixed, in a desirable network environment, a long preloaded video causes network bandwidth waste, and a short preloaded video may cause freeze when the application client plays a video.

Currently, no effective solution has been provided to resolve the foregoing problem.

SUMMARY

Embodiments of the present disclosure provide a video preloading method and apparatus, to resolve at least a technical problem that a length of a preloaded video cannot be flexibly adjusted.

According to an aspect of the embodiments of the present disclosure, a video preloading method is provided, including: obtaining a playing request for playing a first video in a first application client; detecting a data transmission speed of a network of the first application client when playing the first video; adjusting, according to the detected data transmission speed, a preloading length of the first video in the first application client; and preloading, in the first application client, video frames of the first video based on the preloading length of the first video.

According to another aspect of the embodiments of the present disclosure, a video preloading apparatus is further provided, including: a memory and a processor coupled to the memory. The processor is configured for obtaining a playing request for playing a first video in a first application client; detecting a data transmission speed of a network of the first application client when playing the first video; adjusting, according to the detected data transmission speed, a preloading length of the first video in the first application client; and preloading, in the first application client, video frames of the first video based on the preloading length of the first video.

According to another aspect of the embodiments of the present disclosure, a video preloading apparatus is further provided, including: a memory and a processor coupled to the memory. The processor is configured for obtaining a playing request for playing a first video in a first application client; detecting a data transmission speed of a network of the first application client when playing the first video; adjusting, according to the detected data transmission speed, a preloading length of the first video in the first application client; and preloading, in the first application client, video frames of the first video based on the preloading length of the first video.

According to another aspect of the embodiments of the present disclosure, a non-transitory computer readable storage medium is provided. The storage medium stores a program instruction for, when being executed by a processor, implementing a video preloading method, the method includes: obtaining a playing request for playing a first video in a first application client; detecting a data transmission speed of a network of the first application client when playing the first video; adjusting, according to the detected data transmission speed, a preloading length of the first video in the first application client; and preloading, in the first application client, video frames of the first video based on the preloading length of the first video.

BRIEF DESCRIPTION OF THE DRAWINGS

The accompanying drawings described herein are used to facilitate understanding of the present disclosure, and constitute a part of this application. Exemplary embodiments and descriptions thereof of the present disclosure are used to explain the present disclosure, and constitute no limitation on the present disclosure. The accompanying drawings are as follows.

DESCRIPTION OF EMBODIMENTS

To make a person skilled in the art better understand the solutions of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that terminologies such as "first", "second", and the like in this specification, claims, and the accompanying drawings of the present disclosure are used to distinguish similar objects, and are not used to describe a specific sequence or order. It should be noted that data used in this manner is exchangeable in a proper case, so that the embodiments of the present disclosure described herein can be implemented in sequences in addition to the sequences illustrated or described herein. In addition, the terms "include", "have", or any variation thereof are intended to cover a non-exclusive inclusion. For example, a process, method, system, product, or device that includes a series of steps or units is not limited to the clearly listed steps or units; and instead, may further include a step or unit that is not clearly listed, or another step or unit that is intrinsic to the process, method, product, or device.

Embodiments of the present disclosure provides a method embodiment that may be executed by an apparatus provided in the embodiments of this application. It should be noted that steps shown in the flowchart of the accompanying drawings may be performed in the computer system by using, for example, a set of computer executable instructions. In addition, although the flowchart shows a logical sequence, the shown or described steps may be performed in a different sequence in some cases.

Embodiments of the present disclosure provides a video preloading method.

Figure 1:
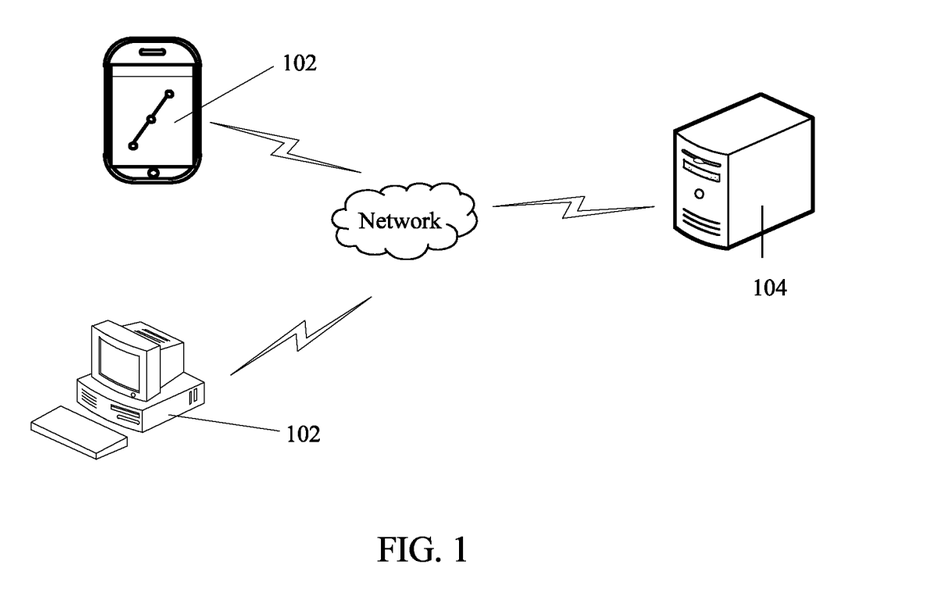
FIG. 1 is a schematic diagram of a hardware environment according to an embodiment of the present disclosure.

Optionally, in embodiments, the video preloading method may be applied to a hardware environment including a terminal 102 and a server 104 shown in FIG. 1. As shown in FIG. 1, the terminal 102 is connected to the server 104 by using a network. The network includes but is not limited to: a mobile communications network, a wide area network, a metropolitan area network, or a local area network. The terminal 102 may be a mobile phone terminal, a PC terminal, a notebook terminal, or a tablet computer terminal.

A main working principle of the hardware environment system shown in FIG. 1 is as follows: The terminal 102 sends a playing request used to request to play a first video in a first application client of the terminal 102 to the server 104; when the terminal 102 plays the first video, the server 104 detects a data transmission speed of a network of the first application client of the terminal 102; the server 104 adjusts, according to the detected data transmission speed, a preloading length of the first video of the terminal 102; and the server 104 preloads, in the first application client, video frames having the video length in the first video.

Figure 2:
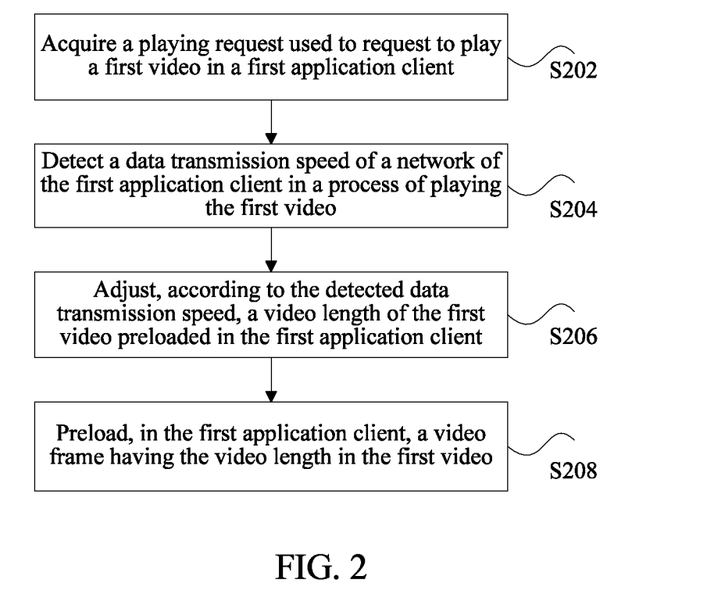
FIG. 2 is a flowchart of a video preloading method according to an embodiment of the present disclosure.

FIG. 2 is a flowchart of a video preloading method according to an embodiment of the present disclosure. The video preloading method may be executed by a video preloading apparatus disposed in an application client. The video preloading apparatus, as used herein, may refer to a component of a video playing application client that dynamically controls preloading/buffering strategy of video playing. The video preloading method provided in embodiments of the present disclosure is specifically described below with reference to FIG. 2. As shown in FIG. 2, the video preloading method mainly includes step S202 to step S208.

Step S202: Acquire a playing request used to request to play a first video in a first application client. In other words, the first application client may acquire a playing request for playing the first video. The first video, as used herein, may refer to a portion of or all of a video requested by the user for being played in the first application client. For example, the video requested by the user may be a video having a total length of 30 minutes, and the first video may refer to, for example, the entire 30-minute video, or a one-minute video within the 30-minute video (e.g., a video clip starting from currently playing time stamp 11:45 to time stamp 12:45 from the requested video). Preloading/buffering the first video, as used herein, may refer to download a portion of the requested video ahead of a playing progress of the requested video, such that the first application client can have quick access to downloaded content and play the requested video smoothly.

Figure 3:
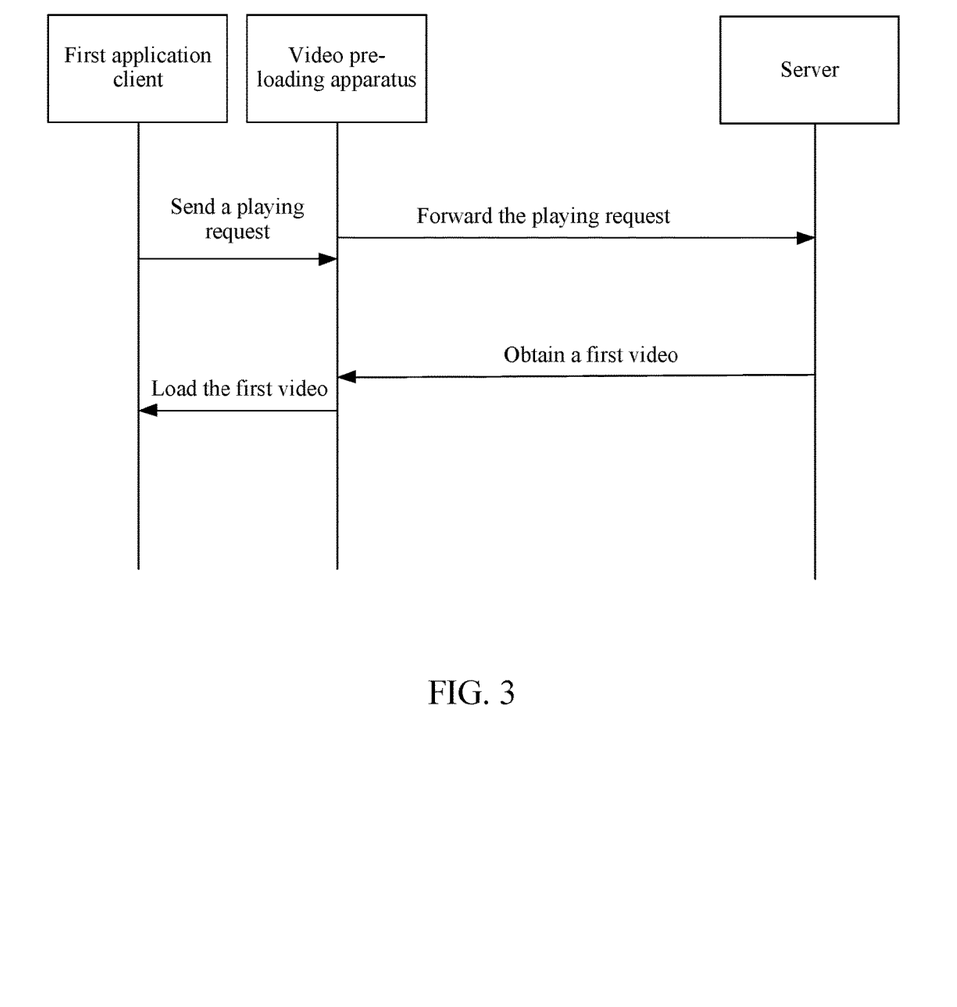
FIG. 3 is an interaction diagram of a video preloading method according to an embodiment of the present disclosure.

The first application client may be a video playing client of a mobile phone, a video playing client of a computer, a video playing client of a tablet, a video playing client of a web page, or the like. The first video may be a video that a user wants to view. As shown in FIG. 3, the first application client sends the playing request for playing the first video, and the playing request is forwarded by a video preloading apparatus to a server associated with the first application client. The playing request for playing the first video is used to request to play the video (that is, the first video) that a user wants to view in the first application client. It is set that when the video preloading apparatus of the first application client obtains, from the server (for example, a content delivery network), the first video preloaded in the first application client, the downloaded first video may be buffered in the video preloading apparatus, or may be directly loaded in the first application client. The video preloading apparatus may control a downloading speed of the first video; therefore, the server does not need to control a downloading speed, that is, network speed limitation is not needed. When the preloaded first video is downloaded, because the video preloading apparatus can provide a local HTTP proxy service, after the downloaded first video is buffered in the video preloading apparatus, downloading from the server may be temporarily paused before the first video needs to be obtained from the server again, to reduce bandwidth that is between the first application client and the server and that is occupied to download the first video. In the existing technology, the first application client directly obtains the preloaded first video from a content delivery network (CDN for short), and both the first application client and the CDN limit a speed when the preloaded first video is downloaded. Therefore, bandwidth is always occupied, network transmission load is increased, and network transmission pressure is very large. The video preloading method provided in the embodiments of the present disclosure saves bandwidth and reduces network transmission load.

Step S204: Detect a data transmission speed of a network of the first application client in a process of playing the first video. The data transmission speed is a speed at which the first video is transmitted.

Step S206: Adjust, according to the detected data transmission speed, a preloading length of the first video. The preloading length may be a variable dynamically adjusted according to network speed and the requested video. The preloading length may be indicated by video duration (e.g., next 10 seconds of the first video starting from the currently playing time point) or video frame quantity (e.g., next 500 frames starting from the currently playing video frame).

The data transmission speed affects smoothness of playing the first video in the first application client. Therefore, when the data transmission speed is high, the first video is downloaded at a high speed, and a shorter length of the first video needs to be preloaded (i.e., a shorter preloading length of the first video is needed), to avoid that excessive bandwidth resources of a server (e.g., HTTP server of video data) are occupied. When the data transmission speed is low, the first video is downloaded at a low speed, and a longer length of the first video needs to be preloaded, to ensure smoothness of playing the first video.

Step S208: Preload, in the first application client, video frames having the video length in the first video. When the first application client plays the first video, the preloaded first video waits for playing, and when a playing time falls within a time period of the preloaded first video, the preloaded first video is played. That is, the first application client may preload video frames of the first video based on the preloading length of the first video.

In embodiments, the preloading length of the first video is adjusted according to the data transmission speed, so that the preloading length of the first video changes together with the data transmission speed. Because the preloading length of the first video can be flexibly adjusted, when the data transmission speed is high, bandwidth occupation can be reduced, and when the data transmission speed is low, buffer and freeze can be avoided when the first video is played. Therefore, the existing-technology technical problem that a length of a preloaded video cannot be flexibly adjusted is resolved, and a technical effect that a length of a preloaded video is flexibly adjusted is achieved.

It should be noted that the video preloading apparatus may be a part of the first application client, or may be a plug-in or a system associated with the first application client. A form of the video preloading apparatus is not limited herein.

Optionally, the adjusting, according to the detected data transmission speed, a preloading length of the first video includes: increasing the preloading length of the first video, where the increased preloading length of the first video corresponds to the data transmission speed; or decreasing the preloading length of the first video, where the decreased preloading length of the first video corresponds to the data transmission speed.

In a process of playing the first video, the data transmission speed of the network of the client (that is, the first application client) of the user is detected. If the detected data transmission speed of the network of the client of the user is high, a time required to download the first video is short. In this case, although the preloading length of the first video is short, the video that needs to be played can be downloaded in time. Therefore, the preloading length of the first video is reduced, to reduce buffer space occupation of the first application client and network bandwidth occupation. If the detected data transmission speed of the network of the client of the user is low, a time required to download the first video is long. In this case, a long length of the first video needs to be preloaded, to ensure smoothness of playing the first video. Therefore, the preloading length of the first video is increased.

For example, if the detected data transmission speed of the network of the client (that is, the first application client) of the user is high, the preloading length of the first video by using HTTP is reduced to 30 seconds, and 30 seconds of the first video is preloaded in the client of the user by using HTTP. If the detected data transmission speed of the network of the client (that is, the first application client) of the user is low, the preloading length of the first video by using HTTP is increased to 50 seconds, and 50 seconds of the first video is preloaded in the client of the user by using HTTP.

That is, when the detected data transmission speed of the network of the client of the user is high, although the preloading length of the first video is short, the video can be played smoothly. When the detected data transmission speed of the network of the client of the user is low, if the preloading length of the first video is short, buffer probably occurs (e.g., the first application client stops playing the first video to buffer subsequent contents), and user experience is affected. Therefore, the preloading length of the first video needs to be a long video length.

Optionally, the preloading, in the first application client, video frames having the video length in the first video includes: preloading, in the first application client, video frames that are after a current playing location and that have the video length in the first video.

After the video length of the first video that needs to be preloaded in the first application client is determined, the video frames having the video length are preloaded in the first application client. It should be noted that a start location of the video length of the first video that needs to be preloaded in the first application client is the current playing location of the first video.

Figure 4:
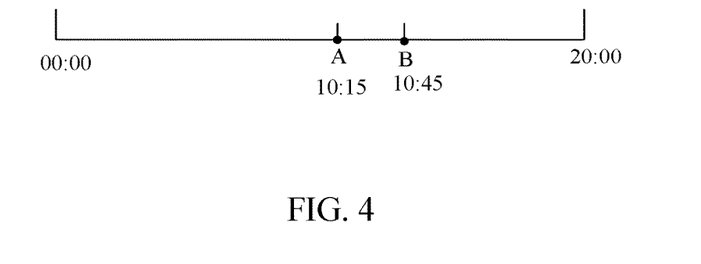
FIG. 4 is a schematic diagram of a video length of video preloading according to an embodiment of the present disclosure.

For example, as shown in FIG. 4, a total video length of a video V1 (that is, the first video) viewed by a user Jia on a video playing client (that is, the first application client) of a mobile phone is 20 minutes, and the user Jia reaches 10:15 (a point A in FIG. 4) of the video V1, that is, the current playing location of the video V1 is 10:15.

Assuming that the video length of the video V1 preloaded in the video playing client of the user Jia is determined as 30 seconds according to a data transmission speed of a network of the video playing client of the user Jia, video frames of 30 seconds from 10:15 to 10:45 (a point B in FIG. 4) of the video V1 are preloaded in the video playing client of the mobile phone of the user Jia. It should be noted that the video frames of 30 seconds may be continuous video frames of 30 seconds or interrupted video frames.

The data transmission speed may include two downloading speeds. A first downloading speed is a downloading speed at which the first application client downloads the first video from a connected server, and a second downloading speed is a downloading speed at which the first application client downloads the first video from another client. The two cases are described below in detail. Another client or second application client, as used herein, may refer to an application client installed in a computing terminal different from the first application client. The first application client may be configured to connect to the another client and receive data of the first video.

In the first case, the data transmission speed includes a downloading speed at which the first application client downloads the first video from a connected server, and the adjusting, according to the detected data transmission speed, a preloading length of the first video includes: detecting a consumed download time of the preloaded first video already downloaded in the first application client from the server; and using a video length corresponding to the detected consumed download time as the preloading length of the first video.

When the data transmission speed includes the downloading speed at which the first application client downloads the first video from the connected server, the downloading speed of the first application client may be measured by the consumed download time.

Specifically, a time consumed to preload the first video previously is detected, and the time is the consumed download time. The video length of the currently preloaded first video is determined according to the consumed download time. If the time consumed to preload the first video previously is long, that is, the consumed download time is long, the video length of the currently preloaded first video that is determined according to the consumed download time is generally also long. This is because if the time consumed to preload the first video previously is long, it indicates that the data transmission speed of the network of the first application client is low. In this case, to avoid buffer when the user views the video, the preloading length of the first video needs to be a long length.

For example, when a network status is desirable (a network speed is quick and stable), T0 (e.g., 50 milliseconds) are needed to preload the video length of L0 (e.g., 30 seconds) of the first video. In some embodiments, T0 and L0 may have preset default values. When the detected consumed download time for downloading a previous preloading length L0 of the first video in the first application client from the server is T1 (e.g., 90 milliseconds), the previous preloading length of the first video needs to be increased. In some embodiments, the previous preloading length of the first video is a preloading length used immediately before the current time point. Further, when determining increasing level of the preloading length of the first video, a relationship between the consumed download time and the previous preloading length may be used. For example, when it is obtained that the preloading length is L1=T1/T0*L0 (e.g., 54 seconds) by proportional calculation according to the consumed download time, the preloading length of the first video is increased from L0 (e.g., 30 seconds) to L1 (e.g., 54 seconds). It should be noted that the proportion relationship used for calculation herein may also be replaced with another index. For example, a correspondence between the consumed download time and the preloading length. Examples are not enumerated herein.

In the second case, the data transmission speed includes the downloading speed at which the first application client downloads the first video from the another client, and before the adjusting, according to the detected data transmission speed, a preloading length of the first video, the video preloading method provided in embodiments of the present disclosure further includes: detecting the downloading speed at which the first application client downloads the first video from the another client; and determining, according to the detected downloading speed at which the first application client downloads the first video from the another client, the preloading length of the first video. In some embodiments, the above-described actions may be performed before the adjusting, according to the detected data transmission speed, a preloading length of the first video. In some embodiments, the downloading speed at which the first application client downloads the first video from the another client may be detected when the preloading length of the first video in the first application client is less than or equal to a current default preloading length. In some embodiments, determining the preloading length of the first video may include determining whether to use a video length of the first video downloaded by the first application client from the another client as the preloading length of the first video.

When the data transmission speed is the downloading speed at which the first application client downloads the first video from the another client, the data transmission speed of the network of the first application client may be measured by the downloading speed at which the first application client downloads the first video from the another client.

The current default preloading length is determined according to the following method: detecting the time consumed to download a previous preloading length of the first video, and using a video length corresponding to the time consumed to download a previous preloading length of the first video as the current default preloading length.

When the preloading length of the first video is less than or equal to the current default preloading length, the downloading speed at which the first application client downloads the first video from the another client is detected. If the detected downloading speed at which the first application client downloads the first video from the another client is high, the preloaded video length of the first video downloaded by the first application client from the another client is used as the preloading length of the first video. If the detected downloading speed at which the first application client downloads the first video from the another client is low, the preloaded video length of the first video downloaded by the first application client from the another client is not used as the preloading length of the first video.

A threshold of the downloading speed may be set. When the downloading speed at which the first application client downloads the first video from the another client is greater than or equal to the threshold, the preloaded video length of the first video downloaded by the first application client from the another client is used as the preloading length of the first video. When the downloading speed at which the first application client downloads the first video from the another client is less than the threshold, the preloaded video length of the first video downloaded by the first application client from the another client is discarded, and preloaded video length of the first video downloaded by the first application client from the connected server is used as the preloading length of the first video.

For example, the first application client may download the video from the another client by means of peer to peer (P2P) downloading. When a downloading speed of P2P downloading is high, a preloaded video length of the first video downloaded by means of P2P downloading is used as the preloading length of the first video. When a downloading speed of P2P downloading is low, a preloaded video length of the first video downloaded by means of P2P downloading is discarded, and a preloaded video length of the first video downloaded by the first application client from the connected server (e.g., by HTTP) is used as the preloading length of the first video.

Optionally, the determining, according to the detected downloading speed at which the first application client downloads the first video from the another client, whether to use a preloaded video length of the first video downloaded by the first application client from the another client as the preloading length of the first video includes: determining whether the preloaded video length of the first video already downloaded by the first application client from the another client reaches a preset proportion of the video length that is of the preloaded first video and that is needed by the first application client; and if the preloaded video length of the first video already downloaded by the first application client from the another client reaches the preset proportion of the video length that is of the preloaded first video and that is needed by the first application client, waiting until the first application client completes downloading of the first video from the another client, and using the preloaded video length of the first video downloaded by the first application client from the another client as the preloading length of the first video; or if the preloaded video length of the first video already downloaded by the first application client from the another client does not reach the preset proportion of the video length that is of the preloaded first video and that is needed by the first application client, determining that the first application client downloads the first video from the connected server.

In some embodiments, the determining, according to the detected downloading speed at which the first application client downloads the first video from one or more second application client, the preloading length of the first video includes: determining whether a video length of video data in the first video already downloaded by the first application client from the one or more second application client in a preset duration (e.g., last 50 milliseconds) reaches a preset proportion of the preloading length. Such determination step evaluates whether the transmission speed between the first application client and the one or more second application client meets a desired requirement. If the video length of the video data reaches the preset proportion in the preset duration, the first applicant client may wait until the first application client completes downloading the preloading length of the first video from the one or more second application client. If the video length of the video data does not reach the preset proportion, the first applicant client may determine to download the preloading length of the first video from a connected server.

For example, the first application client may download the video from the another client by means of P2P downloading, and the preset proportion is set to 90%. Assuming that a proportion of the preloaded video length of the first video already downloaded by means of P2P downloading to the needed preloading length of the first video is 92%, because 92% is greater than the preset proportion 90%, wait until P2P downloading is completed, and the preloaded video length of the first video downloaded by means of P2P downloading is used as the preloading length of the first video. Assuming that a proportion of the preloaded video length of the first video already downloaded by means of P2P downloading to the needed preloading length of the first video is 68%, because 68% is less than the preset proportion 90%, it is considered that the downloading speed of P2P downloading is excessively low, the preloaded video length of the first video downloaded by means of P2P downloading is discarded, the first application client downloads the first video from the connected server, and the preloaded video length of the first video downloaded by the first application client from the connected server is used as the preloading length of the first video.

In some embodiments, the preloading length of the first video is consisted of: a first-portion preloading length corresponding to the one or more second application client, and a second-portion preloading length corresponding to the connected server. The second-portion preloading length can be dynamically adjusted based on the first-portion preloading length. In other words, when connections with the one or more second application client is fast and stable (e.g., the first-portion preloading length is high), the second-portion preloading length can be reduced, thereby decreasing bandwidth resource consumption of the CDN. When the first-portion preloading length is low, the second-portion preloading length can be increased, thereby ensuring desired preloading length for video playing. For example, the first application client may configure a preset proportion of the first-portion preloading length (e.g., P2P download) to the preloading length (e.g., HTTP download and P2P download). The determining, according to the detected downloading speed at which the first application client downloads the first video from the one or more second application client, the preloading length of the first video includes: determining whether a preloaded video length of data in the first video already downloaded by the first application client from the one or more second application client reaches a preset proportion of the preloading length of the first application client; and if the preloaded video length is greater than the preset proportion, decreasing a preloading video length of the first video downloaded from the connected server; or if the preloaded video length does not reach the preset proportion, increasing the preloading video length of the first video downloaded from the connected server.

When the downloading speed at which the first application client downloads the first video from the another client is high, or the proportion of the preloaded video length of the first video downloaded by the first application client from the another client to the needed preloading length of the first video is large, the first video downloaded by the first application client from the another client is used as the preloading length of the first video. In this way, the first video downloaded by the first application client from the another client can be efficiently used, and less bandwidth resources of video server are occupied while the video is played smoothly.

Optionally, after the detecting a data transmission speed of a network of the first application client in a process of playing the first video, the video preloading method provided in embodiments of the present disclosure further includes: when the first application client starts to play the first video, preloading the first video of first duration in the first application client; and after the first application client plays the first video for second duration, adjusting the first duration of the first video preloaded in the first application client to third duration.

When the first application client requests to play the first video, the first video of the first duration is preloaded in the first application client, and if duration for which the first application client plays the first video reaches the second duration, the first duration of the first video preloaded in the first application client is adjusted to the third duration. Generally, a value of the second duration < a value of the first duration < a value of the third duration. That is the second duration is less than the first duration, and the first duration is less than the third duration.

For example, when the first application client requests to play the first video, the preloading length of the first video is 30 seconds (that is, the first duration), and if duration for which the first application client plays the first video reaches 10 seconds (that is, the second duration), the first duration of the first video preloaded in the first application client is adjusted to 60 seconds (that is, the third duration).

If the duration for which the first application client plays the first video reaches the second duration, it indicates that the user is interested in the video to some extent. In this case, the video duration of the first video preloaded in the first application client is increased, to avoid that buffer occurs when the user views the video and consequently user experience is affected. If the first application client stops playing the first video when the duration for which the first application client plays the first video does not reach the second duration, it indicates that the user closes the video within the second duration, and the user is not interested in the video. Because the video length (that is, the first duration) of the first video preloaded in the first application client is short, resource waste is not huge.

Generally, preloading duration may be between 30 seconds and 80 seconds. When a network status is desirable, preloading duration may be between 30 seconds to 40 seconds, and when a network status is poor, preloading duration may be between 60 seconds and 80 seconds.

Preloading duration may also be set according to an actual case, and is not limited to the examples used above.

It should be noted that for the purpose of brief description, the foregoing method embodiments are expressed as a series of action combinations. However, persons skilled in the art should know that the present disclosure is not limited to an action sequence described, because some steps may be performed in another sequence or simultaneously according to the present disclosure. In addition, persons skilled in the art should also know that all the embodiments described in this specification are exemplary embodiments, and actions and modules involved are not necessarily mandatory in the present disclosure.

Through the foregoing description of the embodiments, it is clear to a person skilled in the art that the method of the foregoing embodiments may be implemented by software plus a necessary universal hardware platform, and definitely may also be implemented by hardware, but in many cases, the software implementation is preferred. Based on such an understanding, the technical solutions of the present disclosure essentially or the part contributing to the existing technology may be implemented in a form of a software product. The computer software product is stored in a storage medium (for example, a ROM/RAM, a magnetic disk, or an optical disc) and includes several instructions for instructing a terminal device (which may be a mobile phone, a computer, a server, a network device, or the like) to perform the methods described in the embodiments of the present disclosure.

Embodiments of the present disclosure further provides a video preloading apparatus. The video preloading apparatus is mainly configured to execute the video preloading method provided above in the embodiments of the present disclosure. Therefore, some unnecessary descriptions are omitted in the following descriptions. The video preloading apparatus provided in embodiments of the present disclosure is specifically described below.

Figure 5:
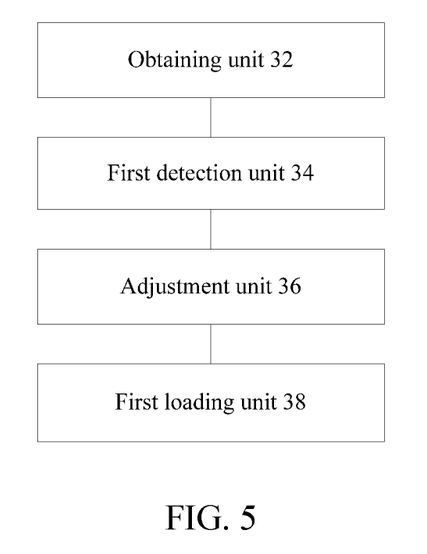
FIG. 5 is a schematic diagram of a video preloading apparatus according to an embodiment of the present disclosure.

FIG. 5 is a schematic diagram of a video preloading apparatus according to embodiments of the present disclosure. As shown in FIG. 5, the video preloading apparatus mainly includes: an obtaining unit 32, a first detection unit 34, an adjustment unit 36, and a first loading unit 38.

The obtaining unit 32 is configured to obtain a playing request used to request to play a first video in a first application client.

The first detection unit 34 is configured to detect a data transmission speed of a network of the first application client in a process of playing the first video. The data transmission speed is a speed at which the first video is transmitted.

The adjustment unit 36 is configured to adjust, according to the detected data transmission speed, a preloading length of the first video.

The first loading unit 38 is configured to preload, in the first application client, video frames having the video length in the first video. When the first application client plays the first video, the preloaded first video waits for playing, and when a playing time falls within a time period of the preloaded first video, the preloaded first video is played.

In embodiments, the adjustment unit 36 adjusts the preloading length of the first video according to the data transmission speed, so that the preloading length of the first video changes together with the data transmission speed. Because the preloading length of the first video can be flexibly adjusted, when the data transmission speed is high, bandwidth occupation can be reduced, and when the data transmission speed is low, buffer and freeze can be avoided when the first video is played. Therefore, the existing-technology technical problem that a length of a preloaded video cannot be flexibly adjusted is resolved, and a technical effect that a length of a preloaded video is flexibly adjusted is achieved.

Optionally, the adjustment unit 36 includes a first adjustment subunit and a second adjustment subunit. The first adjustment subunit is configured to increase the preloading length of the first video, where the increased preloading length of the first video corresponds to the data transmission speed. The second adjustment subunit is configured to decrease the preloading length of the first video, where the decreased preloading length of the first video corresponds to the data transmission speed.

In a process of playing the first video, the first detection unit 34 detects the data transmission speed of the network of the client (that is, the first application client) of the user. If the detected data transmission speed of the network of the client of the user is high, a time required to download the first video is short. In this case, although the preloading length of the first video is short, the video that needs to be played can be downloaded in time. Therefore, the adjustment unit 36 reduces the preloading length of the first video, to reduce buffer space occupation of the first application client and network bandwidth occupation. If the detected data transmission speed of the network of the client of the user is low, a time required to download the first video is long. In this case, a long length of the first video needs to be preloaded to ensure smoothness of playing the first video. Therefore, the adjustment unit 36 increases the preloading length of the first video.

Optionally, the first loading unit 38 includes a loading subunit. The loading subunit is configured to preload, in the first application client, video frames that are after a current playing location and that have the video length in the first video.

After the video length of the first video that needs to be preloaded in the first application client is determined, the video frames having the video length are preloaded in the first application client. It should be noted that a start location of the video length of the first video that needs to be preloaded in the first application client is the current playing location of the first video.

As described above, the data transmission speed may include two downloading speeds. A first downloading speed is a downloading speed at which the first application client downloads the first video from a connected server, and a second downloading speed is a downloading speed at which the first application client downloads the first video from another client. The two cases are described below in detail.

In the first case, the data transmission speed is the downloading speed at which the first application client downloads the first video from the connected server, and the first detection unit 34 includes a detection subunit and a first determining subunit. The detection subunit is configured to detect a consumed download time of the preloaded first video already downloaded in the first application client from the server. The first determining subunit is configured to use a video length corresponding to the detected consumed download time as the preloading length of the first video.

When the data transmission speed is the downloading speed at which the first application client downloads the first video from the connected server, the data transmission speed of the network of the first application client may be measured by the consumed download time.

Specifically, a time consumed to preload the first video previously is detected, and the time is the consumed download time. The video length of the currently preloaded first video is determined according to the consumed download time. If the time consumed to preload the first video previously is long, that is, the consumed download time is long, the video length of the currently preloaded first video that is determined according to the consumed download time is generally also long. This is because if the time consumed to preload the first video previously is long, it indicates that the data transmission speed of the network of the first application client is low. In this case, to avoid buffer when the user views the video, the preloading length of the first video needs to be a long length.

In the second case, the data transmission speed is the downloading speed at which the first application client downloads the first video from the another client, and the video preloading apparatus provided in embodiments of the present disclosure further includes: a second detection unit and a judging unit. The second detection unit is configured to: before the adjustment unit 36 adjusts, according to the detected data transmission speed, the preloading length of the first video, when the preloading length of the first video is less than or equal to a current default preloading length, detect the downloading speed at which the first application client downloads the first video from the another client. The judging unit is configured to determine, according to the detected downloading speed at which the first application client downloads the first video from the another client, whether to use the preloaded video length of the first video downloaded by the first application client from the another client as the preloading length of the first video.

When the data transmission speed is the downloading speed at which the first application client downloads the first video from the another client, the data transmission speed of the network of the first application client may be measured by the downloading speed at which the first application client downloads the first video from the another client.

The current default preloading length is determined according to the following method: first detecting the time consumed to preload the first video previously, and using a video length corresponding to the time consumed to preload the first video previously as the current default preloading length.

When the preloading length of the first video is less than or equal to the current default preloading length, the downloading speed at which the first application client downloads the first video from the another client is detected. If the detected downloading speed at which the first application client downloads the first video from the another client is high, the preloaded video length of the first video downloaded by the first application client from the another client is used as the preloading length of the first video. If the detected downloading speed at which the first application client downloads the first video from the another client is low, the preloaded video length of the first video downloaded by the first application client from the another client is not used as the preloading length of the first video.

A threshold of the downloading speed may be set. When the downloading speed at which the first application client downloads the first video from the another client is greater than or equal to the threshold, the judging unit uses the preloaded video length of the first video downloaded by the first application client from the another client as the preloading length of the first video. When the downloading speed at which the first application client downloads the first video from the another client is less than the threshold, the determining unit discards the preloaded video length of the first video downloaded by the first application client from the another client, and uses the preloaded video length of the first video downloaded by the first application client from the connected server as the preloading length of the first video.

Optionally, the judging unit may further include a judging subunit, a second determining subunit, and a third determining subunit. The judging subunit is configured to determine whether the preloaded video length of the first video already downloaded by the first application client from the another client reaches a preset proportion of the video length that is of the preloaded first video and that is needed by the first application client. The second determining subunit is configured to: if the preloaded video length of the first video already downloaded by the first application client from the another client reaches the preset proportion of the video length that is of the preloaded first video and that is needed by the first application client, wait until the first application client completes downloading of the first video from the another client, and use the preloaded video length of the first video downloaded by the first application client from the another client as the preloading length of the first video. The third determining subunit is configured to: if the preloaded video length of the first video already downloaded by the first application client from the another client does not reach the preset proportion of the video length that is of the preloaded first video and that is needed by the first application client, determine that the first application client downloads the first video from the connected server. When the downloading speed at which the first application client downloads the first video from the another client is high, or the proportion of the preloaded video length of the first video downloaded by the first application client from the another client to the needed preloading length of the first video is large, the first video downloaded by the first application client from the another client is used as the preloading length of the first video. In this way, the first video downloaded by the first application client from the another client can be efficiently used, and less bandwidth resources are occupied while the video is played smoothly.

Optionally, the video preloading apparatus provided in embodiments of the present disclosure further includes: a second loading unit and a determining unit. The second loading unit is configured to: after the first detection unit 34 detects the data transmission speed of the network of the first application client in a process of playing the first video, when the first application client starts to play the first video, preload the first video of first duration in the first application client. The determining unit is configured to: after the first application client plays the first video for second duration, adjust the first duration of the first video preloaded in the first application client to third duration.

When the first application client requests to play the first video, the first video of the first duration is preloaded in the first application client, and if duration for which the first application client plays the first video reaches the second duration, the first duration of the first video preloaded in the first application client is adjusted to the third duration. Generally, a value of the second duration < a value of the first duration < a value of the third duration.

If the duration for which the first application client plays the first video reaches the second duration, it indicates that the user is interested in the video to some extent. In this case, the video duration of the first video preloaded in the first application client is increased, to avoid that buffer occurs when the user views the video and consequently user experience is affected. If the first application client stops playing the first video when the duration for which the first application client plays the first video does not reach the second duration, it indicates that the user closes the video within the second duration, and the user is not interested in the video. Because the video length (that is, the first duration) of the first video preloaded in the first application client is short, resource waste is not huge.

Figure 6:
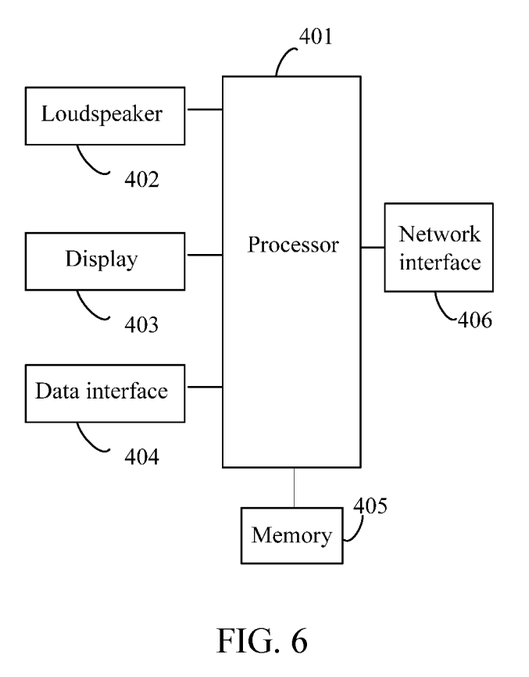
FIG. 6 is a structural hardware diagram of a terminal according to an embodiment of the present disclosure.

Embodiments of the present disclosure further provides a mobile terminal configured to execute the foregoing video preloading method. As shown in FIG. 6, the mobile terminal mainly includes: a processor 401, a loudspeaker 402, a display 403, a data interface 404, a memory 405, and a network interface 406.

The loudspeaker 402 is mainly configured to play audio information of a first video.

The data interface 404 mainly transmits video data of a third party to the processor 401 by means of data transmission.

The memory 405 is mainly configured to: store the first video and execute various operation instructions in the video preloading method shown in FIG. 2.

The network interface 406 is mainly configured to: perform network communication with a server, and send a playing request used to request to play the first video to the server.

The display 403 is mainly configured to display the first video.

The processor 401 is mainly configured to perform the following operations:

controlling the network interface 406 to send the playing request used to request to play the first video to the server, controlling the network interface 406 to receive video data of the first video sent by the server, controlling the memory 405 to store the first video, controlling the display 403 to display the first video, and controlling the loudspeaker 402 to play the audio information of the first video.

The processor 401 may be further configured to control the data interface 404 to transmit video data of a third party to the processor 401 by means of data transmission.

In embodiments, the processor 401 may further execute various instructions that are stored in the memory 405 to execute the foregoing video preloading method, to execute the video preloading method. For specific examples of embodiments, refer to specific examples described in the video preloading method, and details are not described herein again in embodiments.

Embodiments of the present disclosure further provides a computer readable storage medium. Optionally, in embodiments, the storage medium may be configured to store program code of the video preloading method in the embodiments of the present disclosure.

Optionally, in embodiments, the storage medium may be located in at least one network device of multiple network devices in a mobile communications network, a wide area network, a metropolitan area network, or a local area network.

Optionally, in embodiments, the storage medium may include but is not limited to: various mediums that can store program code such as a USB flash drive, a read-only memory (ROM, Read-Only Memory), a random access memory (RAM, Random Access Memory), a removable hard disk, a magnetic disc, and an optical disc.

In the embodiments of the present disclosure, a playing request used to request to play a first video in a first application client is obtained; a data transmission speed of a network of the first application client is detected in a process of playing the first video; a preloading length of the first video is adjusted according to the detected data transmission speed; and video frames having the video length in the first video are preloaded in the first application client. The preloading length of the first video is adjusted according to the data transmission speed, so that the preloading length of the first video changes together with the data transmission speed. Because the preloading length of the first video can be flexibly adjusted, when the data transmission speed is high, bandwidth occupation can be reduced, and when the data transmission speed is low, buffer and freeze can be avoided when the first video is played. Therefore, a technical effect that a length of a preloaded video is flexibly adjusted is achieved, and the technical problem that a length of a preloaded video cannot be flexibly adjusted is resolved.

Sequence numbers in the embodiments of the present disclosure are only intended for description, and do not indicate superiority or inferiority of the embodiments.

When the integrated unit in the foregoing embodiments is implemented in the form of a software functional unit and sold or used as an independent product, the integrated unit may be stored in the computer-readable storage medium. Based on such an understanding, the technical solutions of the present disclosure essentially, or the part contributing to the existing technology, or all or a part of the technical solutions may be implemented in a form of a software product. The computer software product is stored in a storage medium and includes several instructions for instructing one or more computer devices (which may be a personal computer, a server, or a network device) to perform all or a part of the steps of the methods described in the embodiments of the present disclosure.

In the foregoing embodiments of the present disclosure, description of each embodiment has its focus. For any part in an embodiment that is not described in detail, reference may be made to a related description in another embodiment.

In the embodiments provided in this application, it should be understood that the disclosed client may be implemented in other manners. The described apparatus embodiments are merely exemplary. For example, the division of units is merely logical functional division, and there may be other division forms in real application. For example, multiple units or components may be combined or be integrated to another system, or some features may be ignored or be not executed. Furthermore, the displayed or discussed mutual couplings or direct couplings or communication connections may be implemented through some interfaces. The indirect couplings or communication connections between the units or modules may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

What is described above is merely preferred implementation manners of the present disclosure. It should be pointed out that a person of ordinary skill in the art may further make some improvements and embellishments without departing from the principle of the present disclosure, and the improvements and embellishments shall also fall within the protection scope of the present disclosure.

What is claimed is:

1. A video preloading method, comprising:
    obtaining a playing request for playing a first video in a first application client;
    detecting a data transmission speed of a network of the first application client when playing the first video, wherein the data transmission speed comprises a downloading speed at which the first application client downloads the first video from one or more second application client;
detecting the downloading speed at which the first application client downloads the first video from the one or more second application client;
determining, according to the detected downloading speed at which the first application client downloads the first video from the one or more second application client, a preloading length of the first video, comprising:
  determining whether a video length of video data in the first video already downloaded by the first application client from the one or more second application client in a preset duration reaches a preset proportion of the preloading length; and
  if the video length of the video data reaches the preset proportion in the preset duration, waiting until the first application client completes downloading the preloading length of the first video from the one or more second application client; or
  if the video length of the video data does not reach the preset proportion,
determining to download the preloading length of the first video from a server;
adjusting, according to the detected data transmission speed, the preloading length of the first video in the first application client; and
preloading, in the first application client, video frames of the first video based on the preloading length of the first video.

2. The method according to claim 1, wherein the adjusting, according to the detected data transmission speed, a preloading length of the first video comprises:
  increasing the preloading length of the first video, wherein the increased preloading length of the first video corresponds to the data transmission speed; or
  decreasing the preloading length of the first video, wherein the decreased preloading length of the first video corresponds to the data transmission speed.

3. The method according to claim 1, wherein the preloading, in the first application client, video frames of the first video comprise:
  preloading, in the first application client, the video frames that are located after a current playing location and that have the preloading length.

4. The method according to claim 1, wherein after the detecting a data transmission speed of a network of the first application client, the method further comprises:
  when the first application client starts to play the first video, preloading the first video by a first duration in the first application client; and
  after the first application client plays the first video for a second duration, adjusting the first duration to a third duration corresponding to the preloading length, wherein the second duration is less than the first duration, and the first duration is less than the third duration.

5. A video preloading apparatus, comprising:
a memory;
a processor coupled to the memory, wherein the processor is configured for:
obtaining a playing request for playing a first video in a first application client;
detecting a data transmission speed of a network of the first application client when playing the first video, wherein the data transmission speed comprises a downloading speed at which the first application client downloads the first video from one or more second application client;
detecting the downloading speed at which the first application client downloads the first video from the one or more second application client;
determining, according to the detected downloading speed at which the first application client downloads the first video from the one or more second application client, a preloading length of the first video, comprising:
  determining whether a video length of video data in the first video already downloaded by the first application client from the one or more second application client in a preset duration reaches a preset proportion of the preloading length; and
  if the video length of the video data reaches the preset proportion in the preset duration, waiting until the first application client completes downloading the preloading length of the first video from the one or more second application client; or
  if the video length of the video data does not reach the preset proportion, determining to download the preloading length of the first video from a server;
adjusting, according to the detected data transmission speed, a preloading length of the first video in the first application client; and
preloading, in the first application client, video frames of the first video based on the preloading length of the first video.

6. The apparatus according to claim 5, wherein the adjusting, according to the detected data transmission speed, a preloading length of the first video comprises:
  increasing the preloading length of the first video, wherein the increased preloading length of the first video corresponds to the data transmission speed; or
  decreasing the preloading length of the first video, wherein the decreased preloading length of the first video corresponds to the data transmission speed.

7. The apparatus according to claim 5, wherein the preloading, in the first application client, video frames of the first video comprises:
  preloading, in the first application client, the video frames that are located after a current playing location and that have the preloading length.

8. The apparatus according to claim 5, wherein after the detecting a data transmission speed of a network of the first application client, the processor is further configured for:
  when the first application client starts to play the first video, preloading the first video by a first duration in the first application client; and
  after the first application client plays the first video for a second duration, adjusting the first duration to a third duration corresponding to the preloading length, wherein the second duration is less than the first duration, and the first duration is less than the third duration.

9. A non-transitory computer readable storage medium storing a program instruction for, when being executed by a processor, implementing a video preloading method, the method comprising:
obtaining a playing request for playing a first video in a first application client;
detecting a data transmission speed of a network of the first application client when playing the first video, wherein the data transmission speed comprises a downloading speed at which the first application client downloads the first video from one or more second application client;
detecting the downloading speed at which the first application client downloads the first video from the one or more second application client;
determining, according to the detected downloading speed at which the first application client downloads the first video from the one or more second application client, a preloading length of the first video, comprising:
  determining whether a video length of video data in the first video already downloaded by the first application client from the one or more second application client in a preset duration reaches a preset proportion of the preloading length; and
  if the video length of the video data reaches the preset proportion in the preset duration, waiting until the first application client completes downloading the preloading length of the first video from the one or more second application client; or
  if the video length of the video data does not reach the preset proportion, determining to download the preloading length of the first video from a server;
adjusting, according to the detected data transmission speed, a preloading length of the first video in the first application client; and
preloading, in the first application client, video frames of the first video based on the preloading length of the first video.

10. The storage medium according to claim 9, wherein the adjusting, according to the detected data transmission speed, a preloading length of the first video comprises:
  increasing the preloading length of the first video, wherein the increased preloading length of the first video corresponds to the data transmission speed; or
  decreasing the preloading length of the first video, wherein the decreased preloading length of the first video corresponds to the data transmission speed.

11. The storage medium according to claim 9, wherein the preloading, in the first application client, video frames of the first video comprises:
  preloading, in the first application client, the video frames that are located after a current playing location and that have the preloading length.

12. The storage medium according to claim 9, wherein after the detecting a data transmission speed of a network of the first application client, the method further comprises:
  when the first application client starts to play the first video, preloading the first video by a first duration in the first application client; and
  after the first application client plays the first video for a second duration, adjusting the first duration to a third duration corresponding to the preloading length, wherein the second duration is less than the first duration, and the first duration is less than the third duration.

* * * * *